3,039,963
METHOD OF PREPARING FERRIMAGNETIC MATERIALS

Robert B. MacCallum, Baltimore, Md., assignor to W. R. Grace & Co., New York, N.Y., a corporation of Connecticut
No Drawing. Filed Feb. 25, 1960, Ser. No. 10,842
8 Claims. (Cl. 252—62.5)

This invention relates to a method of preparing ferrites. More particularly, it relates to a precipitation method of preparing ferrimagnetic materials consisting of yttrium or certain rare earth oxides and ferric oxide.

Ferrite materials have been known for some time. The only natural occurring ferrite is magnetite $FeO.Fe_2O_3$. The physical and magnetic properties of magnetite have been studied in some detail and are published in the technical literature. Several compounds are known which substitute divalent ions for the ferrous oxide in preparing ferrites. Thus, the compounds $ZnO.Fe_2O_3$, $CaO.Fe_2O_3$, $MnO.Fe_2O_3$ and $NiO.Fe_2O_3$ are known and methods for their preparation have been described.

The compounds of the present invention are best characterized by the chemical formula $5Fe_2O_3.3M_2O_3$ where M is yttrium or a rare earth ion of ionic radius less than 1.14 angstroms. The rare earths occupying the positions in the periodic table of the elements between samarium and lutetium have ionic radii of less than 1.14 angstroms.

Finely divided ferrites have been extensively used in pigments or colorants because of their stability to heat, alkaline and acid media and because of the colors obtainable with these materials. They also achieve wide use in the preparation of special shaped magnets because of their ferrimagnetic property and because they are amenable to being formed into special shapes. Certain of the ferrites also have been widely used in the electronic industry.

I have found that certain polycrystalline ferriamgnetic materials having a garnet-like structure and having certain microwave applications can be prepared by a coprecipitation process wherein the precipitation is carried out from an essentially non-aqueous medium; that is, a medium containing a relatively small amount, generally less than about 10 to 20 percent, of water. This coprecipitation from esentially non-aqueous media is particularly advantageous because the product resulting gives a more intimate mixture than coprecipitation from an aqueous media. The ferrites produced by this process have a garnet-like structure and a much smaller crystallite size. Precipitation from a non-aqueous media results in the precipitation of the components as smaller particles which can be converted to the garnet-like structure at lower temperatures. It is well known that ferrites or other ferrimagnetic materials composed of crystallites of small size exhibit "hard" or permanent magnetic properties. In contrast, the materials composed of large sized crystallites exhibit "soft" or temporary magnetic properties. The advantages of permanent magnetization over temporary magnetization for certain uses are obvious.

In accordance with the process of my invention, ferrite materials having a garnet-like structure are prepared by preparing a concentrated aqueous solution of a salt of a rare earth or yttrium and a ferric salt, mixing the solutions in the ratio of 3 moles of yttrium or rare earth ion to 5 moles of ferric ion, and precipitating the hydroxide from a non-aqueous medium with a suitable alkaline material. The precipitated hydroxides are then separated from the liquid, dried and heated to a temperature high enough to insure the formation of the characteristic garnet-like structure.

The characteristic chemical structure for these compounds is best represented by the chemical formula $5Fe_2O_3.3M_2O_3$. M can be yttrium or a rare earth oxide wherein the rare earth ion has an ionic radius of less than 1.14 angstrom units. The rare earth elements from atomic number 62 (samarium) to atomic number 71 (lutetium) all have ionic radii of less than 1.14. Thus, suitable ferrite materials can be prepared, for example, from the coprecipitation of samarium hydroxide, europium hydroxide, gadolinium hydroxide, terbium hydroxide, holmium hydroxide, etc. as well as yttrium hydroxide, with ferric hydroxide. Because of their availability and the uses of yttrium ferrites in the electronics industry, the yttrium salts are preferred for the process of my invention.

The rare earth hydroxide and ferric hydroxide are precipitated to yield a final ratio of 3 moles of rare earth oxide to 5 moles of ferric oxide. Because of the chemical formula of these materials, it is important that the salt solutions be prepared to yield oxides in this ratio. If more or less of either component is used, a product results which is contaminated by a material having a prevoskite-like structure and the chemical formula $FeMO_3$, or $Fe_2O_3$.

Suitable non-aqueous medium for the precipitation include alcohols of 1 to 3 carbon atoms such as methyl, ethyl, isopropyl, etc. and lower ketones such as acetone, other non-aqueous solvents in which the ferric and yttrium salts are soluble up to about 20% by volume may be used.

The yttrium, or rare earth, and iron salt from which the hydroxide is precipitated may be the nitrate, chloride, bromide, sulfate, acetate or other salt soluble in non-aqueous or substantially non-aqueous medium. Because of their availability and ease of preparation, the nitrates are the preferred salts for preparation according to the process of my invention.

The soluble salts are precipitated from the non-aqueous medium with a suitable basic precipitating medium. Thus, this agent may be ammonia, an alkali metal hydroxide, a normal amine, a quaternary ammonium base or any other strongly alkaline reagent which does not form insoluble compounds with the reactants. The mixed yttrium or rare earth salt and iron salt solution may be mixed with the base in non-aqueous medium by dropwise addition or in any other manner that will insure simultaneous precipitation of the trivalent yttrium and iron ions. The difference in the basicity of these ions is well known. In a non-aqueous system, ferric hydroxide $(Fe(OH)_3)$ will precipitate before the yttrium hydroxide $(Y(OH)_3)$ unless adequate precautions are taken.

The precipitation reaction is normally carried out at room temperature with no special precautions taken to heat or cool the solution of the nitrate or to control the temperature of the solution during the precipitation step. The precipitated hydroxides are dried at slightly elevated temperatures using standard chemical techniques. The mixed hydroxides are converted to the ferrites by heating the hydroxides at temperatures of about 400 to 1000° C. The desired product is obtained at temperatures of the order of 400° C. using the technique of precipitation from a non-aqueous medium followed by drying and calcination. Thus, this method represents an improvement over the process of the prior art in that suitable materials are obtainable at a much lower calcination temperature.

The dry, mixed hydroxides are calcined for a period of time sufficient to produce crystalline oxides. Calcination for a period of about 5 to 24 hours gives a satisfactory product. Because of the cost of heating the materials for an extended period of time, heating at a desired temperature for 5 to 15 hours is preferred.

Pressure is not critical but for reasons of economy and ease of operation, I prefer to carry out the process at atmospheric pressure.

The X-ray data on these materials was obtained using the standard X-ray diffraction techniques.

My invention is further illustrated by the following illustrative but non-limiting examples.

*Example I*

A yttrium ferrite was prepared by coprecipitation from an essentially non-aqueous medium. An yttrium nitrate solution was prepared by dissolving 5 grams (0.0442 mole of Y) of yttrium oxide ($Y_2O_3$) in a slight excess of nitric acid. A total of 29.8 grams (0.0737 mole of Fe) of ferric nitrate ($Fe(NO)_3.9H_2O$) was added to this solution and the solution diluted to 100 ml. with distilled water. The mixed nitrates were added slowly to 500 ml. of isopropyl alcohol containing 55 ml. of concentrated ammonium hydroxide. The solution containing the yttrium and ferric nitrates was added slowly to the isopropanol solution while the isopropanol solution was being stirred vigorously. A precipitation occurred almost instantaneously. After the addition of the mixed nitrates was complete, the resulting hydroxides were separated by filtration, washed and dried at 110° C. for a period of about 20 hours.

*Example II*

The effect of calcining these materials at different temperatures was investigated using portions of the hydroxide prepared in Example I. A portion of the hydroxide product that had been dried at 110° C. was transferred to a crucible and heated in a muffle furnace at 1000° C. for 4 hours. The crucible was removed from the furnace and cooled to room temperature. The product was a green material showing a strong magnetic attraction. A sample of this product was submitted for X-ray analysis. The X-ray diffraction pattern showed only garnet lines. The average crystallite size of the material was 540 angstroms.

*Example III*

The effect of heating the dried oxides at 800° C. was investigated. A portion of the product prepared in Example I was transferred to a crucible and heated in a muffle furnace at 800° C. for a period of about 20 hours. The crucible was removed from the furnace and the product allowed to cool to room temperature. The product was a greenish brown material strongly attracted to a magnet. A portion of the sample was submitted for X-ray analysis. The X-ray diffraction pattern showed only garnet lines. The average crystallite size was 540 angstroms.

*Example IV*

The effect of reducing the temperature to 600° C. was investigated. A portion of the product obtained in Example I was transferred to a crucible and heated to 600° C. for a period of 20 hours. The crucible was removed from the furnace and allowed to cool to room temperature. The product was a greenish brown material that was strongly attracted to a magnet. A sample was submitted for X-ray analysis. The X-ray diffraction pattern showed only garnet lines. The average crystallite size was 450 angstroms.

*Example V*

Low temperature treatment to impart the garnet structure and magnetic properties to the hydroxides was investigated by heating a portion of the product from Example I at 400° C. A portion of the product prepared in Example I was transferred to a crucible and heated in a muffle furnace at 400° C. for 16 hours. The product was removed from the furnace and allowed to cool to room temperature. The product was a brownish green material strongly attracted to a magnet. A sample of this material was submitted for X-ray analysis. The X-ray diffraction pattern showed only garnet lines. The average crystallite size was 450 angstrom units.

*Example VI*

The low temperature calcination was repeated using a material that had been freshly prepared. The yttrium ferrite was prepared by coprecipitation from an essentially non-aqueous medium. A yttrium nitrate solution was prepared by dissolving 2.5 grams (0.221 mole of yttrium) of yttrium oxide $Y_2O_3$ in a slight excess of nitric acid. A total of 14.9 grams (0.369 mole of iron) of ferric nitrate $Fe(NO)_3.9H_2O$ was added to the solution and the solution diluted to 50 ml. with distilled water. This mixed solution was added slowly to 250 ml. of isopropanol containing 25 ml. of concentrated ammonium hydroxide. The precipitate was separated by filtration and dried at 130° C. for a period of about 20 hours. A portion of the dried product was transferred to a crucible and heated in a muffle furnace at 400° C. for 6 hours. The crucible was removed from the furnace and allowed to cool to room temperature. The product was strongly magnetic. A sample of this material was submitted for X-ray analysis. The X-ray diffraction pattern showed only garnet lines. The average crystallite size was 450 angstrom units.

*Example VII*

The superiority of the non-aqueous precipitation was demonstrated in a run in which the iron and yttrium hydroxides were precipitated from a solution of distilled water. In this run a total of 16.75 grams of yttrium oxide as a slurry was reacted with 30 ml. of 15.2 normal nitric acid. The oxides dissolved satisfactorily. The solution was diluted to a total volume of 500 ml. with distilled water. A ferric nitrate solution was prepared by weighing 100 grams of ferric nitrate $Fe(NO)_3.9H_2O$ and dissolving the nitrate in 200 ml. of water containing 2 ml. of concentrated nitric acid. These materials were mixed and diluted to 3700 ml. with distilled water. The hydroxides were precipitated with 7% ammonium hydroxide using a conventional mixing nozzle. The flow rates of the two solutions, the mixed nitrates and ammonium hydroxides, fed to the nozzle were adjusted so that the ammonium hydroxide solution was present as a large excess. The hydroxides were precipitated almost instantaneously. At the end of the precipitation the supernatant liquid was removed by centrifuging several times. The solids were washed with water between centrifugal treatments. The washed hydroxides were dried at 110° C. for 5 hours. A portion of the above material was transferred to a platinum dish and calcined for 13 hours at 400° C. The platinum dish was removed from the muffle furnace, allowed to cool to room temperature and the product examined. The product was a black material that showed no magnetic attraction. A portion of the material was submitted for X-ray analysis. The X-ray diffraction pattern showed the material contained no garnet lines and was essentially non-crystalline.

It is apparent from comparison of these data with the data presented in Example VI that the precipitation from essentially a non-aqueous medium is advantageous in that a garnet material can be prepared at a much lower temperature when non-aqueous precipitation is employed.

*Example VIII*

The crystallite size of the materials prepared from aqueous precipitation was investigated. A portion of the material prepared in Example VII was transferred to a platinum dish and heated in a muffle furnace for 13 hours at a temperature of 1000° C. The platinum dish was removed from the furnace, allowed to cool to room temperature and the product examined. The product was a tan material strongly attracted to a magnet. A sample of this material was submitted for X-ray analysis. The X-ray diffraction pattern of the material showed only garnet lines. The average crystallite size was greater than 1000 angstroms.

It is apparent from a comparison of the data presented in this example with the data presented in Example II that a greatly superior material is prepared when the precipitation is carried out in a non-aqueous medium. Thus, the average crystallite size of these materials was approximately twice the size of the material precipitated from a non-aqueous medium and calcined at 1000° C.

Obviously many modifications and variations of the invention as hereinabove set forth may be made without departing from the essence and scope thereof and only such limitations should be applied as are indicated in the appended claims.

What is claimed is:

1. A method of preparing a ferrite material having a garnet-like structure which comprises the steps of preparing a concentrated aqueous solution of an yttrium salt and a rare earth salt wherein said rare earth has an ionic radius of less than 1.14 angstrom units and a ferric salt, mixing said solutions in the ratio of 3 moles of yttrium and rare earth ion to 5 moles of ferric ion, mixing said resulting solution with at least a five fold excess of a water miscible organic solvent having 1 to 3 carbon atoms, precipitating the hydroxides with a basic material selected from the group consisting of alkali metal hydroxides, organic and inorganic nitrogenous bases, separating and drying the precipitated hydroxides, heating said dry hydroxides at a temperature of about 400–1000° C. for a period of time sufficient to form a crystalline structure and recovering the ferrite product.

2. A method of preparing a ferrite material having a garnet-like structure which comprises the steps of preparing a concentrated aqueous solution of an yttrium salt and a rare earth salt selected from the group consisting of samarium, europium, gadolinium, terbium, dysprosium, holmium, erbium, thulium, ytterbium and lutetium and a solution of a ferric salt, mixing said solutions in the ratio of 3 moles of yttrium and rare earth ion to 5 moles of the ferric ion, mixing said solutions with at least a five fold excess of a water miscible organic solvent having 1 to 3 carbon atoms, precipitating the hydroxides with a basic material selected from the group consisting of alkali metal hydroxides, organic and inorganic nitrogenous bases, separating and drying the precipitated hydroxides, heating said dry hydroxides to a temperature of about 400 to 1000° C. for a period of time sufficient to form a crystalline structure and recovering the ferrite product.

3. A method of preparing a ferrite material having a garnet-like structure which comprises the steps of preparing a concentrated aqueous solution of yttrium nitrate and rare earth nitrate selected from the group consisting of samarium, europium, gadolinium, terbium, dysprosium, holmium, erbium, thulium, ytterbium and lutetium and a solution of ferric nitrate, mixing said solutions in the ratio of 3 moles of yttrium and rare earth ion to 5 moles of ferric ion, mixing the resulting solutions with at least a five fold excess of a water miscible organic solvent having 1 to 3 carbon atoms, precipitating the mixed hydroxides with a strong nitrogenous basic material compatible with the anion present in the medium selected, separating and drying the mixed hydroxides, heating said hydroxides to a temperature of 400° C. to 1000° C. for a period of time sufficient to form a crystalline structure and recovering the ferrite product.

4. A method of preparing a ferrite material having a garnet-like structure which comprises the steps of preparing a concentrated aqueous solution of yttrium nitrate and rare earth nitrate selected from the group consisting of samarium, europium, gadolinium, terbium, dysprosium, holmium, erbium, thulium, ytterbium and lutetium and a solution of ferric nitrate, mixing said solutions in the ratio of 3 moles of yttrium and rare earth ion to 5 moles of ferric ion, mixing the resulting solution with at least a five fold excess of a lower alcohol having 1 to 3 carbon atoms, precipitating the mixed hydroxides from the alcoholic medium with a strong nitrogenous basic material compatible with the anion present in the medium selected, separating and drying the mixed hydroxides, heating said hydroxides to a temperature of about 400 to 1000° C. for at least about 5 hours and recovering the ferrite product.

5. A method of preparing a ferrite material having a garnet-like structure which comprises the steps of preparing a concentrated aqueous solution of yttrium nitrate and a solution of ferric nitrate, mixing said solutions in the ratio of 3 moles of yttrium ion to 5 moles of ferric ion, mixing the resulting solution with at least a five fold excess of a lower alcohol having 1 to 3 carbon atoms, precipitating the mixed hydroxides from the alcoholic medium with a strong nitrogenous basic material compatible with the anion present in the medium selected, separating and drying the mixed hydroxides, heating said dry hydroxides to a temperature of about 400 to 1000° C. for at least 5 hours and recovering the ferrite product.

6. A method of preparing an yttrium-iron ferrite having a garnet-like structure which comprises the steps of preparing a concentrated solution of yttrium nitrate and ferric nitrate, mixing said solutions in the ratio of 3 moles of yttrium ion to 5 moles of ferric ion, adding the mixed nitrates to at least a five fold excess of isopropanol containing sufficient ammonium hydroxide to give a strongly alkaline reaction, thereby precipitating the hydroxides separating and drying the precipitated hydroxides, heating said dry hydroxides at a temperature of about 400° C. to 1000° C. for at least 5 hours, cooling and recovering the ferrite product.

7. A method of preparing an yttrium-iron ferrite having a garnet-like structure which comprises the steps of preparing a concentrated solution of yttrium nitrate and ferric nitrate, mixing said solutions in the ratio of 3 moles of yttrium ion to 5 moles of ferric ion, adding the mixed nitrates to at least a five fold excess of isopropanol containing sufficient ammonium hydroxide to precipitate the hydroxides, separating and drying the precipitated hydroxides, heating said dry hydroxides at a temperature of about 800° C. for at least 5 hours, cooling and recovering the ferrite product.

8. A method of preparing an yttrium-iron ferrite having a garnet-like structure which comprises the steps of preparing a concentrated solution of yttrium nitrate and ferric nitrate, mixing said solutions in the ratio of 3 moles of yttrium ion to 5 moles of ferric ion, adding the mixed nitrates to at least a five mold excess of isopropanol containing sufficient ammonium hydroxide to precipitate the hydroxides, separating and drying the precipitated hydroxides, heating said dry hydroxides at a temperature of about 1000° C. for at least 5 hours, cooling and recovering the ferrite product.

References Cited in the file of this patent

UNITED STATES PATENTS 2,938,183    Dillon _____ May 24, 1960

OTHER REFERENCES

Harvey et al.: RCA Review, September 1950, pp. 344–349.

Anderson: Supplement to vol. 30, No. 4, of J. of Applied Physics, page 299 S. (April 1959).

UNITED STATES PATENT OFFICE
CERTIFICATE OF CORRECTION

Patent No. 3,039,963                          June 19, 1962

Robert B. MacCallum

It is hereby certified that error appears in the above numbered patent requiring correction and that the said Letters Patent should read as corrected below.

Column 1, line 38, for "ferriamgnetic" read -- ferrimagnetic --; column 6, line 53, for "mold" read -- fold --.

Signed and sealed this 23rd day of October 1962.

(SEAL)
Attest:

ERNEST W. SWIDER                         DAVID L. LADD
Attesting Officer                            Commissioner of Patents